United States Patent [19]  [11] 3,884,884
Scoggins et al.  [45] May 20, 1975

[54] ARYLENE SULFIDE POLYMERS

[75] Inventors: Lacey E. Scoggins; Robert W. Campbell, both of Bartlesville, Okla.

[73] Assignee: Phillips Petroleum Company, Bartlesville, Ohio

[22] Filed: Nov. 20, 1973

[21] Appl. No.: 417,581

[52] U.S. Cl. .................................. 260/79.1; 260/79
[51] Int. Cl. ............................................. C08g 23/00
[58] Field of Search ............................ 260/79, 79.1

[56] References Cited
UNITED STATES PATENTS
3,354,129  11/1967  Edmonds, Jr. et al. ............. 260/79.1

Primary Examiner—Melvyn I. Marquis

[57] ABSTRACT

A method of producing arylene sulfide polymers employing (1) polyhalosubstituted aromatic compounds; (2) after-defined sources of sulfur; and (3) alkali metal aminoalkanoates.

11 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by contacting at least one polyhalo-substituted aromatic compound, at least one suitable source of sulfur and at least one alkali metal aminoalkanoate. Optionally, there can be present an organic amide. Thus, the use of an alkali metal aminoalkanoate makes unnecessary the employment of an organic amide.

Suitable sources of sulfur include elemental sulfur, hydrogen sulfide, carbon disulfide, carbon oxysulfide, phosphorus pentasulfide and thiocarboxylates and thiocarboxylic acids represented by the formula $R[CXS(M/y)]_n$, wherein R is a hydrocarbon radical having one to about 20 carbon atoms and a valence of $n$; $n$ is an integer having a value within the range of 1 to 4; each X is selected from oxygen and sulfur; each M is hydrogen or a metal selected from the group consisting of lithium, sodium, potassium, rubidium, cesium, magnesium, calcium, strontium and barium; and $y$ is equal to the valence of M. Thus, the thiocarboxylic acids and thiocarboxylates which can be used in the process of this invention include monothiocarboxylic acids, monothiocarboxylates, dithiocarboxylic acids and dithiocarboxylates.

Examples of suitable thiocarboxylic acids and thiocarboxylates include thioacetic acid, sodium thioacetate, calcium thioacetate, dithioacetic acid, lithium dithioacetate, magnesium dithioacetate, thiopropionic acid, sodium thiopropionate, potassium dithiobutyrate, rubidium 2-methylthiohexanoate, cesium 3-phenyldithiooctanoate, lithium 5-cyclopentylthiovalerate, sodium dithioheneicosanoate, cyclohexanecarbothioic acid, potassium cyclohexanecarbothioate, strontium cyclopentanecarbothioate, rubidium 2-methylcyclopentanecarbodithioate, thiobenzoic acid, sodium thiobenzoate, calcium thiobenzoate, cesium 4-ethyldithiobenzoate, sodium thioacrylate, strontium thioacrylate, lithium dithiopropiolate, tetrathiosuccinic acid, sodium tetrathiosuccinate, calcium tetrathiosuccinate, potassium trithioadipate, sodium potassium tetrathiosuberate, rubidium 1,12-dithiodecanedioate, lithium 1,3,5-benzenetricarbothioate, barium 1,2,4-benzenetricarbothioate, sodium 1,2,19,20-eicosanetetracarbodithioate and the like, and mixtures thereof.

Suitable sulfur sources also include thiocarbonates represented by the formula

wherein each R is an alkali metal or a monovalent hydrocarbyl radical selected from alkyl, cycloalkyl and aryl radicals and combinations thereof such as alkaryl, aralkyl, and the like, the number of carbon atoms in said hydrocarbyl radical being within the range of one to about 12, at least one R being a monovalent hydrocarbyl radical, and X is selected from oxygen and sulfur, at least one X being oxygen and at least one X being sulfur. Thus, the term "thiocarbonates" as used herein includes monothiocarbonates and dithiocarbonates, as distinguished from trithiocarbonates hereinafter described.

Examples of some thiocarbonates wich can be used include lithium methylxanthate, potassium ethylxanthate, methyl isopropylxanthate, ethyl butylxanthate, isobutyl hexylxanthate, cyclohexylmethyl (2-ethylhexyl)xanthate, dodecyl dodecylxanthate, cesium dodecylxanthate, cesium cyclohexylxanthate, heptyl (3-methylcyclopentyl)xanthate, sodium phenylxanthate, benzyl p-tolylxanthate, S,S-diethyl dithiocarbonate, S-methyl S-butyl dithiocarbonate, S-cyclopentyl S-phenyl dithiocarbonate, O,O-dipropyl thiocarbonate, O-ethyl O-isobutyl thiocarbonate, O(2-methylcyclopentyl) O-benzyl thiocarbonate, O-phenyl S-cyclohexyl thiocarbonate, S-rubidium O-ethyl thiocarbonate, and the like, and mixtures thereof.

Suitable sulfur sources also include thiocarbamates represented by the formula

wherein each R is selected from hydrogen and R'', R' is selected from alkali metals and R'', R'' is a monovalent hydrocarbyl radical selected from alkyl, cycloalkyl, and aryl radicals, and combinations thereof such as alkaryl, aralkyl, and the like, the number of carbon atoms in said hydrocarbyl radical being within the range of one to about 12, and each X is selected from oxygen and sulfur, at least one X being sulfur.

Examples of some thiocarbamates which can be used include lithium thiocarbamate, methyl butyldithiocarbamate, sodium dimethyldithiocarbamate, sodium ethyldithiocarbamate, S-ethyl propylthiocarbamate, O-isopropyl butylthiocarbamate, butyl methylethyldithiocarbamate, hexyl diphenyldithiocarbamate, potassium p-tolylthiocarbamate, 2-ethylhexyl dibenzyldithiocarbamate, S-decyl dicyclohexylthiocarbamate, dodecyl didodecyldithiocarbamate, O-cyclohexyl dihexylthiocarbamate, rubidium (3-ethylpentyl)dithiocarbamate, S-phenyl didecylthiocarbamate, cyclopentylmethyl (cyclopentylmethyl)dithiocarbamate, cesium (3-methylcyclopentyl)thiocarbamate, 4-methylcyclohexyl octyldithiocarbamate, O-benzyl propylisobutylthiocarbamate, m-tolyl diisopropyldithiocarbamate, and the like, and mixtures thereof.

Suitable sulfur sources also include trithiocarbonates represented by the formula

wherein R is an alkali metal or a monovalent hydrocarbyl radical selected from alkyl, cycloalkyl, and aryl radicals, and combinations thereof such as alkaryl, aralkyl and the like, the number of carbon atoms in said hydrocarbyl radical being within the range of one to about 12.

Examples of suitable trithiocarbonates include lithium trithiocarbonate, sodium trithiocarbonate, potassium trithiocarbonate, rubidium trithiocarbonate, cesium trithiocarbonate, sodium potassium trithiocarbonate, sodium ethyl trithiocarbonate, dimethyl trithiocarbonate, ethyl propyl trithiocarbonate, butyl 2-ethylhexyl trithiocarbonate, isopropyl decyl trithiocarbonate, didodecyl trithiocarbonate, cyclohexyl 3-methylcyclopentyl trithiocarbonate, isobutyl cyclohexylmethyl trithiocarbonate, diphenyl trithiocarbonate, benzyl p-tolyl trithiocarbonate, and the like, and mixtures thereof.

Suitable sulfur sources also include at least one thiosulfate selected from lithium, sodium, potassium, rubidium, cesium, magnesium, calcium, strontium and barium thiosulfates.

Suitable sulfur sources also include thioureas having the formula

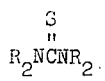

wherein R is selected from the group consisting of hydrogen and alkyl, cycloalkyl, and aryl radicals and combinations thereof such as alkaryl, aralkyl and the like, the number of carbon atoms in each R group being within the range of 0 to about 12.

Examples of some thioureas which can be employed include unsubstituted thiourea, 1-methyl-2-thiourea, 1,3-dimethyl-2-thiourea, 1,1,3,3-tetramethyl-2-thiourea, 1,3-diethyl-2-thiourea, 1,1,3,3-tetraethyl-2-thiourea, 1,3-diisopropyl-1-butyl-2-thiourea, 1-hexyl-3-phenyl-2-thiourea, 1(3-ethylhexyl)-1-decyl-3-cyclohexyl-2-thiourea, 1,1,3,3-tetradodecyl-2-thiourea, 1,1-dibenzyl-2-thiourea, 1-p-tolyl-2-thiourea, 1-(2-methylcyclopentyl)-3-(cyclopentylmethyl)-2-thiourea and the like, and mixtures of the aforementioned thioureas.

Suitable sulfur sources also include thioamides, including acyclic and cyclic thioamides; thus, thiolactams are included within the scope of operable thioamides. The preferred thioamides for use in this invention can be represented by the formula

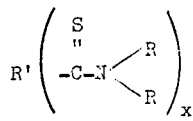

wherein each R is selected from the group consisting of hydrogen and alkyl, cycloalkyl and aryl radicals, and combinations thereof such as alkaryl, aralkyl and the like; R' is selected from the group consisting of hydrogen and hydrocarbon radicals of valence x selected from saturated hydrocarbon radicals, aromatic hydrocarbon radicals and combinations thereof such as alkaryl, aralkyl, arylenedialkyl and the like; and, x is an integer having a value of 1 to 4, with the proviso that when x = 1, R' and one R, together, can represent a divalent hydrocarbon radical selected from the group consisting of unsubstituted and alkyl-, cycloalkyl-, and aryl-substituted alkylene, cycloalkylene, and arylene radicals, the total number of carbon atoms in said thioamide being within the range of 1 to about 20.

Examples of some thioamides which can be employed in the process of this invention include thioformamide, N,N-dimethylthioformamide, thioacetamide, N,N-diethylthioacetamide, N-ethylthiopropionamide, N-cyclohexylthiobutyramide, N-isopropyl-N-phenylthiohexanamide, N-p-tolylthiooctanamide, N-benzylthiododecanamide, N-cyclopentylmethyl-N-3-methylcyclopentylthioacetamide, N,N-dibutylthiobenzamide, N-octyl-2-phenylthioacetamide, thio-p-toluamide, N-dodecyl-3-methylthiohexanamide, thioeicosanamide, N-nonadecylthioformamide, thiocyclohexanecarboxamide, 3-cyclopentylthiopropionamide, dithiohexanediamide, N,N'-dimethyldithioterephthalamide, 1,2-bis(thiocarbamoylmethyl)benzene, 1,2,4-tris(thiocarbamoyl)cyclohexane, 1,2,3,4-tetrakis(thiocarbamoyl)butane, 2-azetidinethione, 2-pyrrolidinethione, 2-piperidinethione, 2-thioxohexamethylenimine, N-methyl-2-pyrrolidinethione, N-isopropyl-3-ethyl-2-piperidinethione, 4-cyclopentyl-2-pyrrolidinethione, 3-phenyl-2-azetidinethione, thiolactam of 2-aminocyclopentanecarbodithioic acid, thiolactam of 2-amino-4-methylcyclooctanecarbodithioic acid, thiolactam of 2-(methylamino)-3-cyclopentylcyclohexanecarbodithioic acid thiolactam of 2-amino-4-phenylcyclopentanecarbodithioic acid, thiolactam of 2-aminobenzenecarbodithioic acid, thiolactam of 2-(ethylamino)-3-isopropylbenzenecarbodithioic acid, thiolactam of 2-amino-4-cyclohexylbenzenecarbodithioic acid, thiolactam of 2-amino-5-phenylbenzenecarbodithioic acid and the like and mixtures thereof.

Suitable sulfur sources also include mercaptans, mercaptides and sulfides having an alpha and/or beta activating substituent and represented by the formula

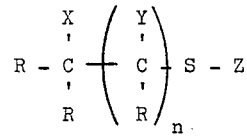

wherein each R is selected from hydrogen and monovalent hydrocarbon radicals selected from alkyl, cycloalkyl and aryl radicals and combinations thereof such as alkaryl, aralkyl and the like having one to about 16 carbon atoms; n is 0 or 1; X and y are each selected from R and Q, at least one of X and Y being Q, with the proviso that when n is 0, X is Q, and when n is 1 and Y is R, at least one R attached to

is hydrogen; Q is an activating substituent selected from —CN,

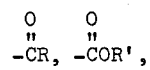

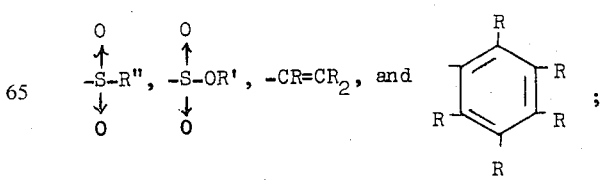

R' is selected from (a) monovalent hydrocarbon radicals selected from alkyl, cycloalkyl and aryl radicals, and combinations thereof such as alkaryl, aralkyl, and the like, having one to about 16 carbon atoms; and (b) M/y, where M is a metal selected from lithium, sodium, potassium, rubidium, cesium, magnesium, calcium, strontium and barium and y is the valence of the metal M; R'' is selected from monovalent hydrocarbon radicals selected from alkyl, cycloalkyl and aryl radicals, and combinations thereof such as alkaryl, aralkyl and the like having one to about 16 carbon atoms; Z is selected from hydrogen, M/y, and

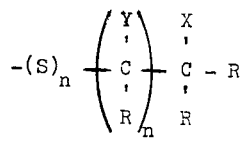

and the total number of carbon atoms in each molecule is within the range of 1 to about 40.

Some examples of suitable mercaptans, mercaptides and sulfides of this formula include monosodium salt of mercaptoacetic acid, disodium salt of mercaptoacetic acid, monosodium salt of 2-mercaptopropionic acid, disodium salt of 2-mercaptopropionic acid, monosodium salt of 3-mercaptopropionic acid, disodium salt of 3-mercaptopropionic acid, disodium salt of mercaptosuccinic acid, trisodium salt of mercaptosuccinic acid, p-dodecylbenzyl mercaptan, sodium salt of p-dodecylbenzyl mercaptan 3-mercaptopropionitrile, (2-mercaptoethyl)benzene, benzyl mercaptan, allyl mercaptan, dilithium salt of 3-cyano-3-mercaptopropionic acid, 2-ethyl-3-mercaptobutyraldehyde, isopropyl 1-mercaptopropyl ketone, cyclohexyl 1-isopropyl-2-mercaptopentyl ketone, methyl 2-butyl-3-mercaptotridecanoate, hexadecyl 2-hexyl-2-mercaptooctadecanoate, potassium salt of phenyl 2-cyclopentyl-3-mercaptopropionate, methyl α-mercaptobenzyl sulfone, calcium salt of hexyl 2-mercaptoethyl sulfone, cyclooctyl mercaptomethyl sulfone, o-tolyl 1-(mercaptomethyl)hexyl sulfone, dipotassium salt of mercaptomethanesulfonic acid, dicalcium salt of 1-(mercaptomethyl)butanesulfonic acid, methyl 1-mercaptoethanesulfonate, benzyl mercaptomethanesulfonate, strontium salt of 2,3-dimethyl-5-mercapto-6-phenyl-2-hexene, cesium salt of 2-phenyl-3-mercaptopropene, barium salt of 2-(p-tolyl)ethyl mercaptan, 1-benzyl-2-(mercaptomethyl)benzene, dibenzyl sulfide, dibenzyl disulfide, diallyl sulfide, bis(2-acetylpropyl) disulfide, bis(1-phenyl-2-nonanoylpentyl) sulfide, bis(-1-cyclohexyl-1-p-toluoyl-2-methylpropyl) disulfide, rubidium salt of bis(1-methyl-1,2-dicarboxyoctyl) sulfide, strontium salt of bis(1-carboxy-2-phenylethyl) disulfide, bis(1-ethyl-2-isobutoxycarbonylethyl) sulfide, bis(1-cyclopentyloxycarbonylpentyl) disulfide, bis(2-p-tolyl-2-m-tolyloxycarbonylethyl) sulfide, bis(1-isopropylsulfonylheptadecyl) disulfide, bis(2-hexadecylsulfonylethyl) sulfide, bis(1-phenylsulfonylhexyl) disulfide, bis(2-phenyl-2-benzylsulfonylethyl) sulfide, cesium salt of bis(sulfomethyl) disulfide, barium salt of bis(2-sulfopropyl) sulfide, bis(1-heptyloxysulfonylnonyl) disulfide, bis(1-methyl-2-cyclopentyl-2-phenoxysulfonylethyl) sulfide, bis(2-nonadecenyl) disulfide, bis[2-(2-isopropyl-5-hexylphenyl)ethyl] sulfide, allyl benzyl disulfide, and the like and mixtures thereof.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and other polyhalosubstituted aromatic compounds described and exemplified in the aforementioned U.S. Pat. No. 3,354,129. Mixtures of dihalobenzenes can be used, for example, a mixture comprising at least one m-dihalobenzene and at least one p-dihalobenzene.

Alkali metal aminoalkanoates which can be employed in the process of this invention can be represented by the formula

wherein each R is selected from the group consisting of hydrogen and hydrocarbyl radicals selected from alkyl, cycloalkyl, and aryl, and combinations thereof such as alkaryl, aralkyl and the like, the number of carbon atoms in each of said hydrocarbyl radicals being within the range of one to about 12, M is an alkali metal selected from lithium, sodium, potassium, rubidium and cesium, n is an integer having a value of 1 to about 12, and the total number of carbon atoms in each molecule of the alkali metal aminoalkanoate is within the range of two to about 24.

Examples of some alkali metal aminoalkanoates which can be employed include lithium aminoacetate, sodium N,N-dimethyl-2-aminopropionate, potassium N-ethyl-3-cyclopentyl-3-aminopropionate, sodium N-methyl-4-aminobutyrate, sodium N-methyl-6-aminohexanoate, rubidium N-isopropyl-3-phenyl-5-aminopentanoate, cesium N-butyl-N-cyclohexyl-3-isopropyl-6-aminohexanoate, potassium N-phenyl-3-butyl-7-aminooctanoate, sodium N-cyclopentyl-4-hexyl-10-aminodecanoate, lithium N-hexyl-6-pentyl-13-aminotridecanoate, sodium N-decyl-4-aminododecanoate, potassium N-nonyl-2-aminotetradecanoate, sodium N-o-tolyl-3-amino-4-phenylbutyrate, rubidium N,N-dibenzyl-2-p-tolyl-3-aminopropionate, cesium 4-aminobutyrate, sodium 5-aminopentanoate, potassium 6-aminohexanoate, and the like, and mixtures thereof.

As mentioned, an organic amide can be included in the reaction mixture. Suitable organic amides will be substantially liquid at the reaction temperatures and pressures employed. The amides can be cyclic or acyclic and can have one to about 10 carbon atoms per molecule. Examples of some suitable amides include formamide, acetamide, N-methylformamide, N-ethylpropionamide, N,N-dimethylformamide, N,N-dimethylacetamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

Although the ratio of reactants can vary considerably, the ratio of gram-moles polyhalo-substituted aromatic compound to gram-atoms of elemental or divalent sulfur in the sulfur source should be within the range of from about 0.9 to about 2 and preferably from about 0.95 to about 1.3. The ratio of gram-moles of the alkali metal aminoalkanoate to gram-atoms of elemental or divalent sulfur in the sulfur source should be within the range of from about 1 to about 4 and preferably from about 1.5 to about 3.5. The organic amide, if employed, will be employed in an amount up to about 2,500 grams of organic amide per gram-mole of polyhalo-substituted aromatic compound.

The components used in the preparation of the arylene sulfide polymer can be introduced into contact in any order. Water which can be present in the composite formed from any of the reactants, or which can be present in any of the reactants, can be removed, for example, by distillation, prior to conducting the polymerization reaction.

The temperature at which the polymerization can be conducted can vary over a wide range and will generally be within the range of from about 125° C. to about 450° C., and preferably within the range of from about 175° C. to about 350° C. The reaction time will be within the range of from about 10 minutes to about 3 days and preferably from about 1 hour to about 8 hours. The pressure need only be sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

It is within the scope of this invention to bring the polyhalo-substituted aromatic compound, the sulfur source, tha alkali metal aminoalkanoate and the organic amide, if employed, into contact in any order.

It is also within the scope of this invention to remove water from any combination of the aforesaid compounds.

The foregoing statements are based upon the following examples.

In the following examples, values for inherent viscosity were determined at 206° C. in 1-chloronaphthalene at a polymer concentration of 0.4 g per 100 ml of solution. Throughout the examples the expression "mol" is intended to mean "gram-mole."

EXAMPLE I

In this example carbon disulfide was employed successfully as the sulfur source.

To an autoclave were charged 41.7 g (0.300 mol) sodium N-methyl-4-aminobutyrate, 15.14 g (0.103 mol) 1,4-dichlorobenzene and 3.8 g (0.0499 mol) $CS_2$. The system was placed under 20 psig nitrogen pressure and heated to 248° C. at which temperature the mixture was held for 4 hours. The mixture was cooled to room temperature and the gray semisolid removed. The solid was washed with seven portions of hot water and dried in a vacuum at 60° C. 8.4 grams of poly(p-phenylene sulfide), representing a yield of 77.7% and having an inherent viscosity of 0.12, was recovered.

EXAMPLE II

In this example, hydrogen sulfide was employed successfully as the sulfur source.

To an autoclave were charged 27.8 g (0.200 mol) of sodium N-methyl-4-aminobutyrate, 15.14 g (0.103 mol) of 1,4-dichloroebenzene and 2.9 g (0.085 mol) of hydrogen sulfide. The system was heated to 248° C. at which temperature it was maintained for 4 hours. The system was cooled to room temperature and the gray product was washed with eight portions of hot water and dried in a vacuum oven at 60° C. 3.1 g (33.8% yield) of poly(p-phenylene sulfide) containing some material insoluble in 1-chloronaphthalene at 206° C. was recovered.

EXAMPLE III

This examaple demonstrates the use of N-methyl-2-pyrrolidinethione as the sulfur source.

83.4 g (0.6 mol) sodium N-methyl-4-aminobutyrate, 34.2 g (0.298 mol) N-methyl-2-pyrrolidinethione and 45.6 g (0.31 mol) of 1,4-dichlorobenzene were charged to a reactor. The reactor was sealed and heated to 250° C. After 3 hours at 250° C. the reactor was cooled and the polymer was removed.

The polymer was mixed thoroughly with water and filtered. The polymer was washed with four portions of hot, deionized water followed by filtrations after each wash. After vacuum drying at about 90° C. for 16 hours, 20 g (62% yield based on the thione) of poly(p-phenylene sulfide) having an inherent viscosity of 0.09 was obtained.

EXAMPLE IV

This example demonstrates the use of thioacetic acid as the sulfur source.

83.4 g (0.6 mol) of sodium N-methyl-4-aminobutyrate, 30.8 g (0.21 mol) of 1,4-dichlorobenzene and 15.2 g (0.2 mol) thioacetic acid were charged to a reactor. The reactor was heated to 250° C and maintained at that temperature for 3⅓ hours. The reactor was cooled and the polymer was removed, washed, dried and recovered in the manner described in Example III. There was recovered 12.6 g (59% yield based on thioacetic acid) of poly(p-phenylene sulfide) having an inherent viscosity of 0.08.

EXAMPLE V

This example demonstrates the use of N-methyl-2-pyrrolidinethione as the sulfur source in the presence of an organic amide.

28 g (0.202 mol) of sodium N-methyl-4-aminobutyrate, 11.5 g (0.1 mol) of N-methyl-2-pyrrolidinethione, 14.9 g (0.101 mol) 1,4-dichlorobenzene and 103 g of N-methyl-2-pyrrolidone were charged to a reactor. The reactor was heated to 248° C. at which temperature it was held for 4 hours. The polymer was removed, washed, dried and recovered in the manner described in Example III. There was recovered 6 g (56% yield based on the thione) of poly(p-phenylene sulfide) having an inherent viscosity of 0.03.

Not all sulfur-containing compounds can be employed as the sulfur source, as is demonstrated by the following example.

EXAMPLE VI 41.7 g (0.3 mol) of sodium N-methyl-4-aminobutyrate, 44.6 g (0.303 mol) of 1,4-dichlorobenzene and 25.8 g (0.3 mol) hydrated sodium bisulfide (NaHS) were charged to a reactor. The reactor was heated to 250° C and held at that temperature for 4 hours. The solids from the reactor were washed with water, leaving the insoluble 1,4-dichlorobenzene which was completely soluble in acetone. No poly(p-phenylene sulfide) was recovered.

The previous examples demonstrate that the use of an organic amide in the polymerization recipe employed to prepare poly(p-phenylene sulfide) from the defined sulfur sources is not essential provided sodium N-methyl-4-aminobutyrate is present.

It will be evident from the foregoing that various modifications can be made to the method of this invention. Such, however, are considered as being within the scope of the invention.

What is claimed is:

1. A method of producing a polymer which comprises:

contacting at least one polyhalo-substituted aromatic compound in which the halogen atoms are attached to aromatic ring carbon atoms, at least one alkali metal aminoalkanoate having the formula $R_2N(CR_2)_nCO_2M$ wherein each R is selected from the group consisting of hydrogen and hydrocarbyl radicals selected from alkyl, cycloalkyl and aryl radicals and combinations of said radicals, the number of carbon atoms in each of said radicals being within the range of one to about 12, M is an alkali metal selected from lithium, sodium, potassium, rubidium, and cesium, $n$ is an integer having a value of 1 to about 12, and the total number of carbon atoms in each molecule of the alkali metal aminoalkanoate is within the range of two to about 24 and at least one sulfur source selected from the group consisting of (a) elemental sulfur; (b) hydrogen sulfide; (c) carbon disulfide; (d) carbon oxysulfide; (e) phosphorus pentasulfide; (f) thiosulfates selected from lithium, sodium, potassium, rubidium, cesium, magnesium, calcium, strontium, and barium thiosulfates; (g) thiocarboxylates and thiocarboxylic acids having the formula $$R[CXS(M/y)]_n$$

wherein R is a hydrocarbon radical having 1 to about 20 carbon atoms and a valence of $n$, $n$ is an integer having a value within the range of 1 to 4, each X is selected from oxygen and sulfur, each M is hydrogen or a metal selected from the group consisting of lithium, sodium, potassium, rubidium, cesium, magnesium, calcium, strontium, and barium and y is equal to the valence of M; (h) thiocarbonates having the formula

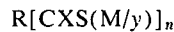

wherein each R is an alkali metal or a monovalent hydrocarbyl radical selected from alkyl, cycloalkyl and aryl radicals and combinations of said radicals, the number of carbon atoms in said hydrocarbyl radical being within the range of one to about 12, at least one R being a monovalent hydrocarbyl radical, and X is selected from oxygen and sulfur, at least one X being oxygen and at least one X being sulfur; (i) thiocarbamates represented by the formula

wherein each R is selected from hydrogen and R'', R' is selected from alkali metals and R'', R'' is a monovalent hydrocarbyl radical selected from alkyl, cycloalkyl and aryl radicals and combinations of said radicals, the number of carbon atoms in said hydrocarbyl radical being within the range of one to about 12 and each X is selected from oxygen and sulfur, at least one X being sulfur; (j) trithiocarbonates represented by the formula

wherein R is an alkali metal or a monovalent hydrocarbyl radical selected from alkyl, cycloalkyl and aryl radicals and combinations of said radicals, the number of carbon atoms in said hydrocarbyl radical being within the range of one to about 12; (k) thioureas having the formula

wherein R is selected from the group consisting of hydrogen and alkyl, cycloalkyl and aryl radicals and combinations of said radicals, the number of carbon atoms in each R group being within the range of 0 to about 12; (l) thioamides having the formula

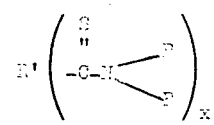

wherein each R is selected from the group consisting of hydrogen and alkyl, cycloalkyl and aryl radicals and combinations of said radicals, R' is selected from the group consisting of hydrogen and hydrocarbon radicals of valence x selected from saturated hydrocarbon radicals, aromatic hydrocarbon radicals and combinations of said radicals and x is an integer having a value of 1 to 4, with the proviso that when $x = 1$, R' and one R, together, can represent a divalent hydrocarbon radical selected from the group consisting of unsubstituted and alkyl-substituted, cycloalkyl-substituted, and aryl-substituted alkylene, cycloalkylene and arylene radicals, the total number of carbon atoms in said thioamide being with the range of one to about 20; and (m) mercaptans, mercaptides and sulfides having an alpha and/or beta activating substituent and represented by the formula

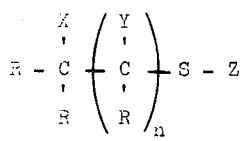

wherein each R is selected from hydrogen and monovalent hydrocarbon radicals selected from alkyl, cycloalkyl and aryl radicals and combinations of said radicals having one to about 16 carbon atoms, $n$ is 0 or 1, X and Y are each selected from R and Q, at least one of X and Y being Q, with the proviso that when $n$ is 0, X is Q, and when $n$ is 1 and Y is R, at least one R attached to

is hydrogen, Q is an activating substituent selected from

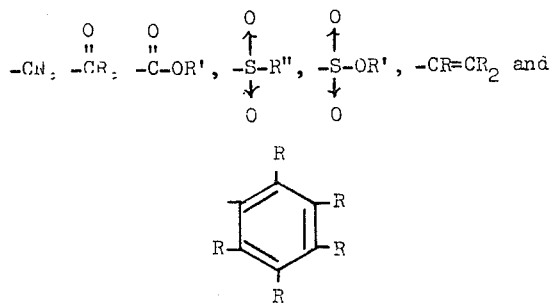

R' is selected from monovalent hydrocarbon radicals selected from alkyl, cycloalkyl and aryl radicals and combinations of said radicals, having one to about 16 carbon atoms, and M/$y$, where M is a metal selected from lithium, sodium, potassium, rubidium, cesium, magnesium, calcium, strontium, and barium and $y$ is the valence of the metal M, R'' is selected from monovalent hydrocarbon radicals selected from alkyl, cycloalkyl and aryl radicals and combinations of said radicals having one to about 16 carbon atoms, Z is selected from hydrogen, M/$y$ and

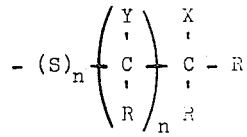

and the total number of carbon atoms in each molecule is within the range of one to about 40, under polymerization conditions to produce said polymer.

2. The method of claim 1 in which an organic amide is present during the contacting.

3. The method of claim 1 in which said aminoalkanoate is sodium N-methyl-4-aminobutyrate.

4. The method of claim 3 in which said polyhalo-substituted aromatic compound is 1,4-dichlorobenzene.

5. The method of claim 4 in which said sulfur source is carbon disulfide.

6. The method of claim 4 in which said sulfur source is hydrogen sulfide.

7. The method of claim 4 in which said sulfur source is N-methyl-2-pyrrolidinethione.

8. The method of claim 4 in which said sulfur source is thioacetic acid.

9. The method of claim 2 in which said sulfur source is thioacetic acid.

10. The method of claim 1 in which said alkali metal aminoalkanoate is employed in an amount of from about 1 to about 4 gram-moles per gram-atom of elemental or divalent sulfur in said sulfur source.

11. The method of claim 2 in which said sulfur source is N-methyl-2-pyrrolidinethione.

* * * * *